United States Patent [19]

Davis

[11] 3,931,009
[45] Jan. 6, 1976

[54] WATER PURIFICATION APPARATUS AND TIMING DEVICE FOR INITIATING A BACKWASHING CYCLE

[76] Inventor: Oliver Thurston Davis, Rte. 1, P.O. Box 33, Dunlap, Tenn. 37327

[22] Filed: Jan. 17, 1974

[21] Appl. No.: 434,184

[52] U.S. Cl. ............... 210/108; 210/123; 210/143; 210/151; 210/257; 73/224
[51] Int. Cl.² .................. B01D 23/24; B01D 23/20; G01F 3/24
[58] Field of Search .......... 210/108, 123, 143, 125, 210/127, 257; 73/221, 224, 225, 226

[56] References Cited
UNITED STATES PATENTS

| | | | |
|---|---|---|---|
| 1,556,186 | 10/1925 | Wall | 73/225 |
| 3,021,276 | 2/1962 | Mast | 210/108 X |
| 3,347,379 | 10/1967 | Miller | 210/127 |
| 3,350,937 | 11/1967 | Brewer | 73/224 |
| 3,682,307 | 8/1972 | Cook et al. | 210/257 X |

Primary Examiner—Frank A. Spear, Jr.
Assistant Examiner—Ferris H. Lander

[57] ABSTRACT

A water purification apparatus is disclosed having an aeration chamber for aerating unpurified water from a source. A filter chamber is provided beneath the aeration chamber containing granular media for filtering the aerated water and having spaced apart headers for introducing backwash water as well as removing filtered water for storage in a reservoir beneath the filter chamber. A float actuated valve controls the flow of filtered water from the header to the reservoir in response to the water level of aerated water in the filter chamber. A float actuated timing device is provided for controlling the introduction of backwash water to the headers for a predetermined duration in response to the frequency the reservoir has been filled and emptied of purified water.

8 Claims, 10 Drawing Figures

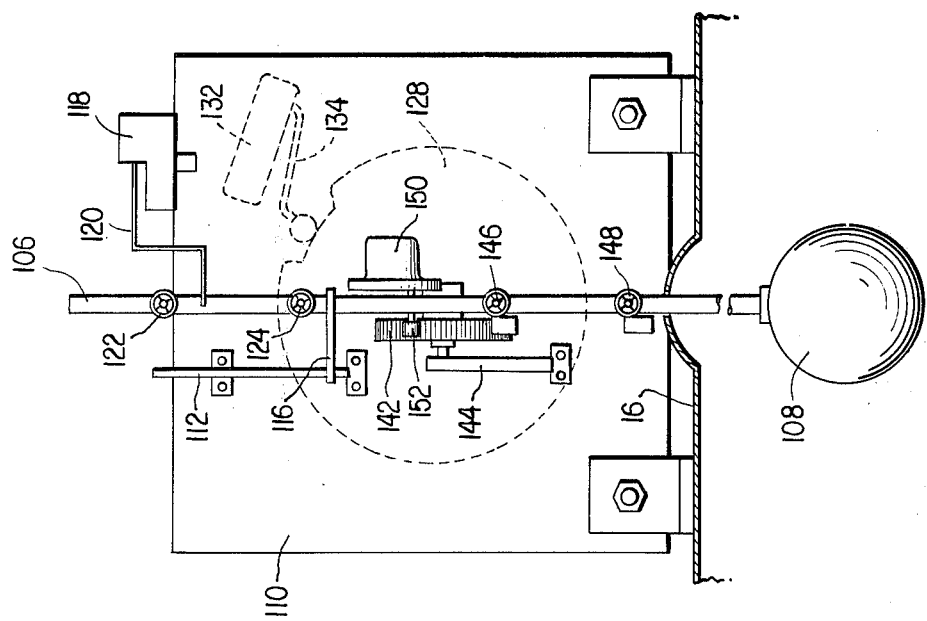
FIG. 5
FIG. 4
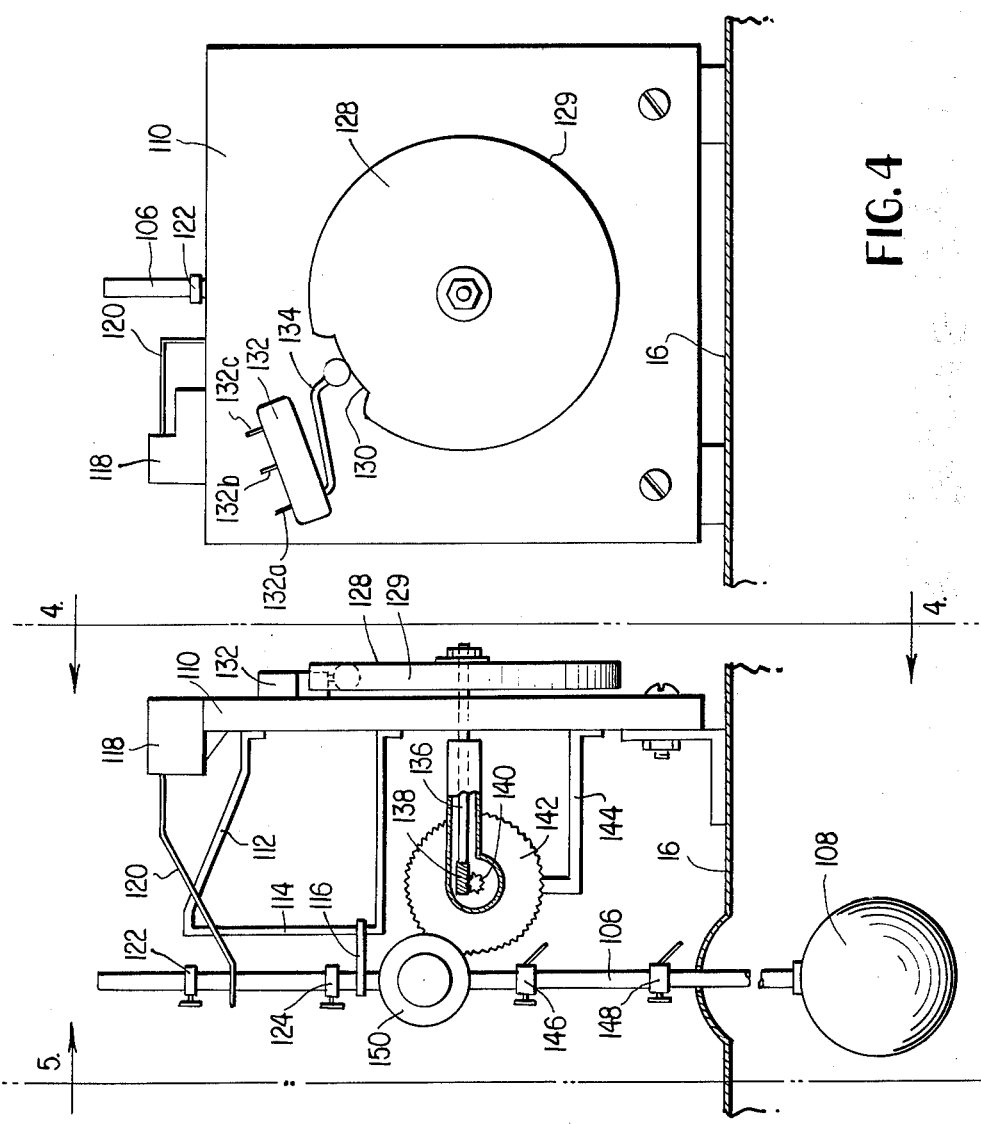
FIG. 3

WATER PURIFICATION APPARATUS AND TIMING DEVICE FOR INITIATING A BACKWASHING CYCLE

RELATED APPLICATION

This application is related to my co-pending application Ser. No. 402,287, filed Oct. 1, 1973, entitled: "Mobile Automatic Water Purification Apparatus" and now abandoned.

BACKGROUND OF THE INVENTION a. Field of the Invention.

This invention relates to water purification devices in general and more specifically a small, compact water purification plant employing a novel timing mechanism for controlling a backwashing cycle.

b. Description of the Prior Art.

Applicant is not aware of any device such as the one herein disclosed for initiating, controlling the duration of, and stopping the backwashing cycle of a water purification apparatus. Most prior art water purification apparatus whether large or small depend on electric clock-type timers for controlling the backwash cycle for the filter media. Such electric timers initiate the backwashing cycle after the passage of a certain period of time. This period of time may be totally unrelated to the actual need of the filter for backwashing which is normally a function of the amount of water that actually passed through the filter media as well as the specific chemical nature of the unpurified water supplied to the apparatus.

Other devices for initiating the backwash cycle of filtering apparatus measure the amount of water actually filtered. Such devices are very expensive in themselves and contribute significantly to the overall cost of any apparatus in which they are employed.

It is therefore the primary object of the present invention to provide a compact water purification plant having a novel device for initiating, controlling the duration of and stopping the backwashing cycle in response to the actual amount of water filtered by said plant.

It is another object to provide such a control device which is simple in its construction and extremely reliable in its operation.

It is a still further object to provide such a control device which is inexpensive to manufacture when compared to devices of the prior art for performing the same function.

Other objects and advantages will be apparent and understood from the following description and drawings.

SUMMARY OF THE INVENTION

The present invention provides an areation chamber having openings to permit air to enter the chamber. The areation chamber has a nozzle for discharging the raw water to be treated in the form of a spray. Chemicals which may be required are mixed with the raw water before it exits from the nozzle. The thus areated water falls to the top of a filter chamber located below the aeration chamber.

The filter chamber has a circular trough extending around the top thereof for receiving overflowing backwash water. The filter chamber is packed with a filter media consisting of several layers of different size aggregate. A collector in the form of a header is positioned in the layer of largest aggregate at the bottom of the filter chamber. The areated and filter water enters the collector header and from there it passes through a control valve into a treated water reservoir located below the filter chamber. When the reservoir is full, a float actuated switch de-energizes the raw water pump shutting off the plant.

In order to backwash the filter media, a second header is positioned a short distance below the top of the filter media and connected to the collector header and a pressurized source of backwash water via a solenoid actuated valve. A timing mechanism is provided which energizes the solenoid valve to start the backwash operation for a predetermined duration in response to the number of times the reservoir has been filled and emptied. The timing mechanism comprises a float ball on the surface of the water in the reservoir which is connected to a long, vertically extending rod. The rod has spaced apart pawls which engage a toothed wheel or gear to rotate same as the float ball drops in the tank. A small motor is also mounted on the rod and it has a drive gear which engages the toothed wheel only when the float ball is at its lowest point. A notched wheel is also provided which is driven by the toothed wheel and a micro-switch having an actuating arm is biased into engagement with the notched wheel. As the notched wheel is rotated each time the reservoir is emptied, the actuating arm will eventually engage the notch, closing the micro-switch. Closure of the micro-switch opens the solenoid valve to introduce backwash water to the headers and also start the small motor. The small motor slowly rotates the notched wheel forcing the actuating arm out of the notch which in turn stops the backwash cycle after a predetermined amount of time and the plant is then restored to normal operation.

BRIEF DESCRIPTION OF THE DRAWINGS

FIG. 3 is an enlarged side elevational view of the timing device of the present invention taken along the lines 3—3 of FIG. 2, FIG. 4 is a view of the timing device of FIG. 3 taken along the lines 4—4, FIG. 5 is a view of the timing device of FIG. 3 taken along the lines 5—5.

DETAILED DESCRIPTION OF PREFERRED EMBODIMENT

Figure 1:
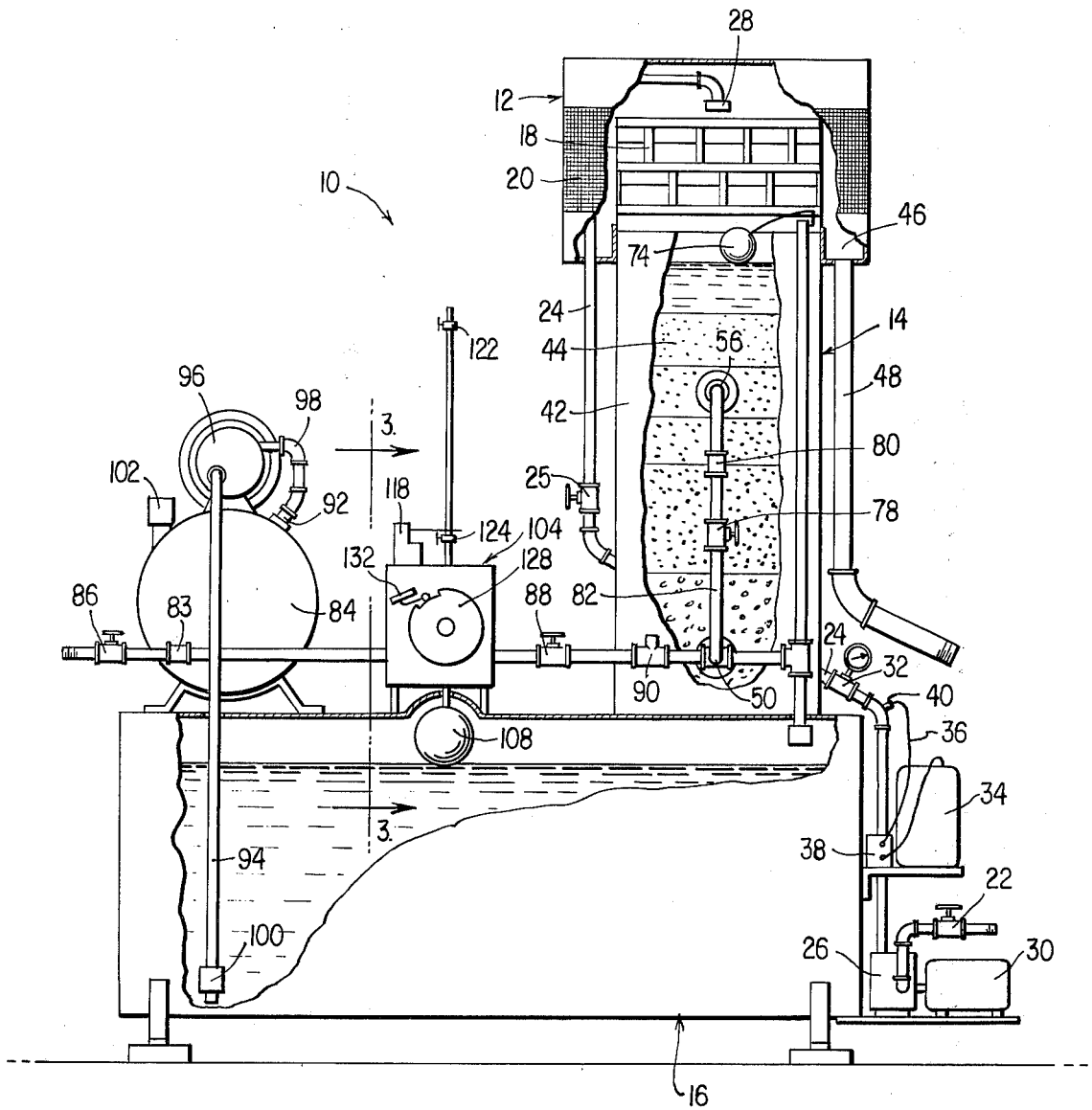
FIG. 1 is a side elevational view with parts broken away of the improved water purification apparatus of the present invention.

Referring now to the drawings wherein similar characters of reference represent corresponding parts in each of the several views.

Figure 2:
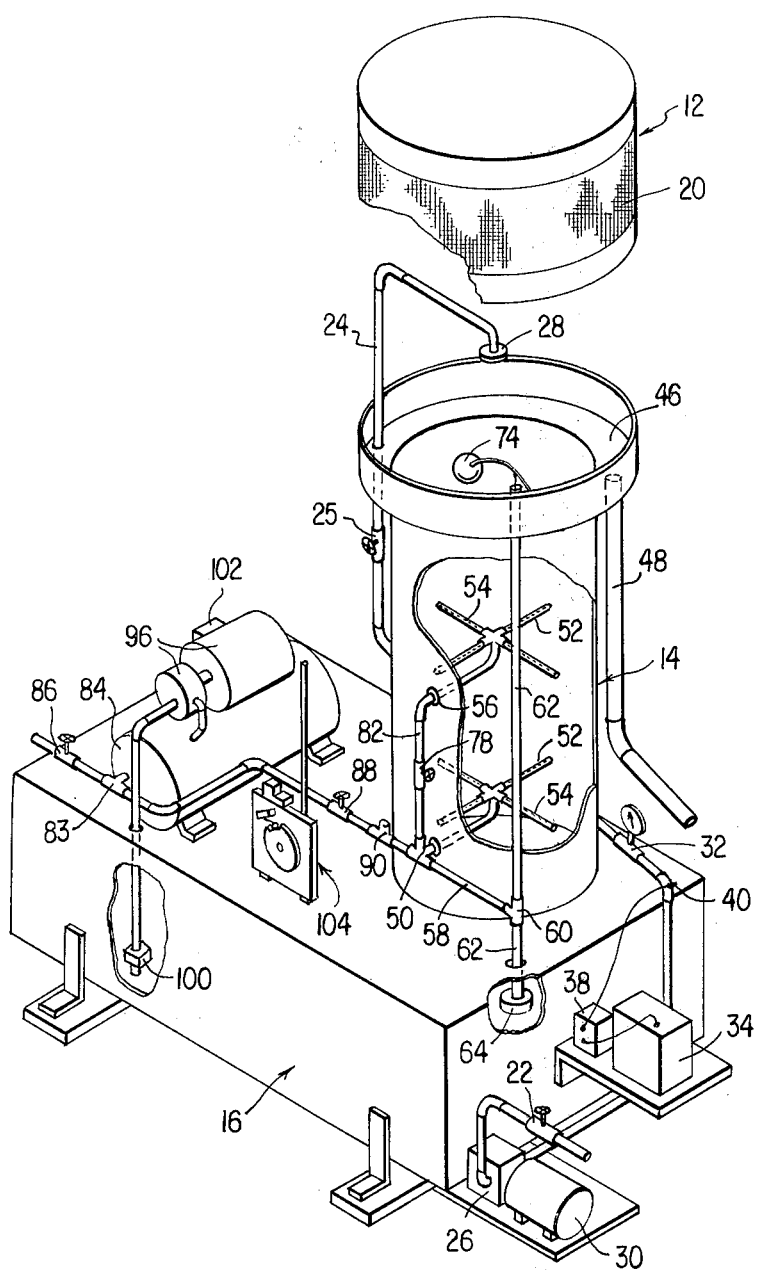
FIG. 2 is a perspective view of the apparatus shown in FIG. 1 also with a portion broken away.

With reference to FIGS. 1 and 2, the water purification plant of the present invention is shown generally at 10. The plant 10 consists of three basic elements, an aeration chamber 12, a filter chamber 14 and a reservoir tank 16. The aeration chamber 12 is circular in shape and is removably mounted on top of the filter chamber 14. The aeration chamber has a circular shaped core 18 which has louvers which form recesses resembling a honeycomb to permit air to enter the hollow center of the core. Screening 20 is located around and spaced apart from the core to keep out insects and the like.

Raw water to be purified is pumped from a source in an inlet valve 22 to inlet pipe 24 by means of an electric intake pump 26 driven by electric motor 30. The inlet pipe 24 is connected to a nozzle 28 positioned above the hollow center of the core 18 in the aeration chamber 12. The amount of water flowing from the nozzle 28 in gallons per minute will determine the output of the purification plant measured over a 24 hour period. The rate of waterflow from nozzle 28 can be controlled by valve 22 and the pressure of the flow indicated on gauge 32 in inlet pipe 24. Various disinfecting chemicals, such as chlorine, can be added to the raw water prior to its discharge from nozzle 28. The chemicals are stored in tank 34 and pumped therefrom via hose 36 by means of electric pump 38 to a fitting 40 also positioned in the inlet pipe 24. The chemicals serve to control the pH level of the raw water and are necessary to make most raw water potable. The flow rate of chemicals being pumped by pump 38 can be controlled so that the proper amounts of chemicals are added in proportion to the flow rate of raw water being introduced.

As the raw, chemically treated water emanates from the nozzle 28 in the form of a fine spray, it is areated in the aeration chamber 12. Areation of the raw water serves to remove objectionable odors and, more importantly, oxidize matter in the raw water to facilitate its removal in the filter chamber 14 which will now be described. The rate of flow of chemically treated water can be controlled by globe type valve 25.

The filter chamber 14 has a cylindrical-shaped housing 42 made of heavy gauge sheet metal. The metal is coated with a layer of polyvinyl chloride to resist corrosion. Approximately three-fourths of the interior of the filter chamber 14 is filled with filter media 44. The filter media 44 consists of aggregate of various sizes which is divided into layers, there being a layer of each size aggregate. The layer of largest aggregate is at the bottom of the filter chamber with succeeding layers of aggregate of lesser size placed on top of each other as shown. A commercially available filtering product such as "Anthrafilt" in aggregate sizes from 1 to 6 can, for example, be used as the filter media 44. A U-shaped trough 46 is secured around the outside of the housing 42 adjacent the top thereof. A drain pipe 48 is connected to the bottom of the trough 46 and serves to carry away backwash water collected in the trough in a manner to be more fully described later.

The thus chemically treated and areated raw water enters the filter chamber 14 and passes through the aforementioned layers of filter media 44. A header system is provided comprising a first header 50 positioned at the bottom of the filter chamber 14 and surrounded by the largest aggregate of filter media 44. The first header 50 has a plurality of radially extending pipes 52 containing holes 54 which serve the dual function of collecting the filtered water from the bottom of the filter chamber 14 as well as to introduce backwash water to clean the filter media 44. A second header 56 is positioned in the filter media 44, parallel to the first header 50 and a distance below the top of the filter media 44. The second header 56 is similar in construction to the first header 50 having the same radially extending pipes 52 and holes 54. The second header 56 serves only to introduce backwash water into the upper layers of filter media 44. The manner of the introduction of backwash water to the headers 50, 56 will be more fully described later.

As the filtered water passes through the holes 54 in the first header 50, it flows by gravity into the reservoir 16 via pipe 58, T-fitting 60, pipe 62 and flow rate control valve 64. Flow rate control valve 64 is shown more clearly in FIG. 6 as comprising a valve seat 66 and a valve head 68 connected by means of a rod 70 to a pivotably mounted lever 72 and float ball 74. The rod 70 extends through the pipe 62 and exits the top thereof through a suitable, watertight packing 76.

When the filter chamber 14 is empty of water, the weight of float ball 74 causes flow rate control valve 64 to close. As water is introduced to the filter chamber 14 via nozzle 28, the filter media 44 becomes saturated and water begins to accumulate in the area above the filter media 44. As the water continues to accumulate, the float ball 74 begins to rise thereby opening flow rate control valve 64 to permit the filtered water to enter the reservoir 16. The float 74 and control valve 64 thus act to maintain the rate of flow of water through the filter chamber 14 in proportion to the amount being introduced to the filter chamber 14 from nozzle 28.

The first header 50 is connected to second header 56 by way of a conventional globe-type valve 78, a check valve 80 and piping 82. Check valve 80 is so positioned as to prohibit filtered water from being collected by the second header 56 but does permit backwash water to be fed to the second header 56 and out holes 54. The first header 56 is also connected to the outlet 83 of a holding tank 84 and to a purified water outlet valve 86 via a manual backwash valve 88 and an electrically actuated, normally closed, solenoid valve 90. The inlet 92 of the holding tank 84 is connected to the discharge outlet of a pressure responsive, electrically operated water pump 96 via pipe 98. The inlet to the pump 96 is connected to the reservoir 16 via pipe 94 and check valve 100. Check valve 100 is so positioned to permit purified water to be withdrawn from the reservoir 16 but not enter the reservoir via pipe 94.

As purified water enters the reservoir 16, it is pumped into holding tank 84 by means of pump 96. When the air pressure in the top of the holding tank 84 reaches a preselected amount, a pressure responsive switch 102 de-energizes the pump 96. Water will then continue to flow into the reservoir 16 until intake pump motor 30 is de-energized.

The mechanism for controlling energization of the intake pump motor 30 and energization of solenoid valve 90 for starting and stopping the backwashing operation, is shown generally at 104.

Referring to FIGS. 3, 4 and 5, the control mechanism 104 consists of a vertically extending rod 106 which has a float 108 secured to one end thereof. The float 108 and rod 106 thus move up and down vertically as the water level in the reservoir 16 so moves. A support plate 110 is mounted on the reservoir 16 and has a spaced apart bracket 112 secured thereto. A portion 114 of the bracket 112 is proximate and parallel to the rod 106. The rod 106 has a perpendicularly extending member 116 secured to it which slidably engages the portion 114 to thereby maintain and support rod 106 in its vertical upright position during its movement. A switch 118 is mounted on the support plate 110 and has an actuating arm 120 extending to the rod 106. Adjustable upper stop 122 and lower stop 124 are positioned on the rod 106 for engaging the actuating arm 120 to close the switch 118. When the upper stop 122 engages the actuating arm 120 indicating the reservoir 16 is empty, switch 118 closes to energize pump motor 30 to fill the reservoir and when the reservoir 16 is full, stop 124 engages the actuating arm 120 to stop the pump motor 30.

Figure 6:
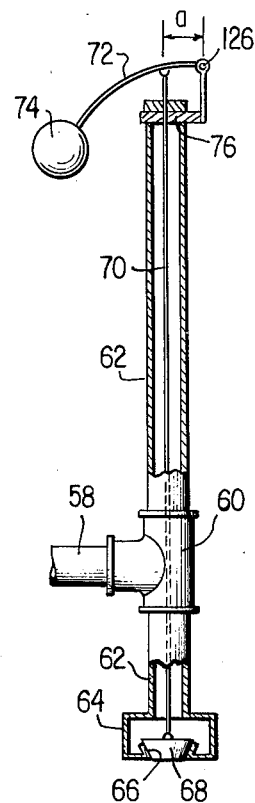
FIG. 6 is a cross-sectional view of the control valve and float actuator therefor, FIG. 7 (a), (b), (c) is a schematic representation of the sequence of operations of the timing device of the present invention.

To start the introduction of backwash water to the headers 50, 56, solenoid valve 90 is energized in a manner to be more fully described later. Upon energization of valve 90 to its open position, water under pressure from holding tank 84 will enter the headers 50, 56 and out the holes 54 in pipes 52 into the filter media 44. The pressurized water also enters pipes 58, 62 and forces valve head 68 into sealing engagement with valve seat 66. As the backwash water flows rapidly from the holes 54, it has sufficient pressure and velocity to displace and separate the particles of filter media 44 and filtered solids and causes the filter bed to expand. Check valve 100 prevents water from entering the reservoir 16 after it has been pumped into holding tank 84. By using two headers during the backwash operation, applicants have found that more efficient cleansing action is achieved which is particularly necessary in the layers of finer filter aggregate. The filtered out solids have a lower density than the filter media 44 and are thus carried to the top of the filter media where they overflow into the U-shaped trough 46 and out drain pipe 48. When the backwash water reaches the float 74, the buoyancy of the float exerts a force on lever 72 which in turn tries to raise the valve head 68 against the aforementioned pressure exerted on the valve head by the backwash water in pipe 62. As can be seen in FIG. 6, the rod 70 is connected to the lever 72 at a point a distance ($a$) from the fulcrum point of the lever 126. The size of the float 74 and the distance ($a$) are so chosen that a force of only about 5 to 6 pounds is exerted on the rod 70 to thereby lift the valve head 68. Because the pressure exerted by the backwash water on the valve head 68 via pipe 62 is approximately 20 pounds per square inch, valve head 68 remains closed as the backwash water covers the float 74 and runs over into trough 46. After the lapse of a predetermined period of time, the solenoid 90 is deenergized, in a manner to be presently described, and the apparatus returns to its normal operation.

Referring again to FIGS. 3, 4 and 5, the mechanism for energizing and de-energizing solenoid valve 90 to start and stop the backwash operation consists of a rotatable circular disc 128 having a notch 130 in its outer periphery 129. A switch 132 having an actuating arm 134 is mounted on the support plate 110 adjacent the disc 128. Switch 132 has three contacts, 132a, 132b and 132c. When the actuating arm 134 is in the notch 130, switch contacts 132a and 132b close to energize solenoid valve 90 and switch contacts 132b and 132c are opened. When the actuating arm 134 is out of the notch 130 and adjacent the periphery 129, switch contacts 132a and 132b open and contacts 132b and 132c close to thereby permit energization of pump motor 30 as will be described in greater detail with respect to the operation of the apparatus and the wiring diagram of FIG. 8.

The disc 128 is rotatably mounted on the support plate 110 by means of a shaft 136 having a gear 138 on one end. The gear 138 is in meshing engagement with another gear 140 which is connected to a large gear wheel 142. The shaft 136 and gears 138, 142 are supported relative to the support plate 110 by means of a bracket 144. The disc 128 is rotated slowly as the gear wheel 142 is rotated via transmission gears 138, 140 by means of an upper and lower adjustable dog or pawls 146 and 148 respectively mounted on the rod 106. Also mounted on the rod 106 is a small electric motor 150 which has a gear 152 secured to the end of its rotating drive shaft. The gear 152 engages gear wheel 142 each time the float 108 is at its lowest point of travel in reservoir 16 as will now be more fully described with reference to FIGS. 7a–c.

Figure 7:
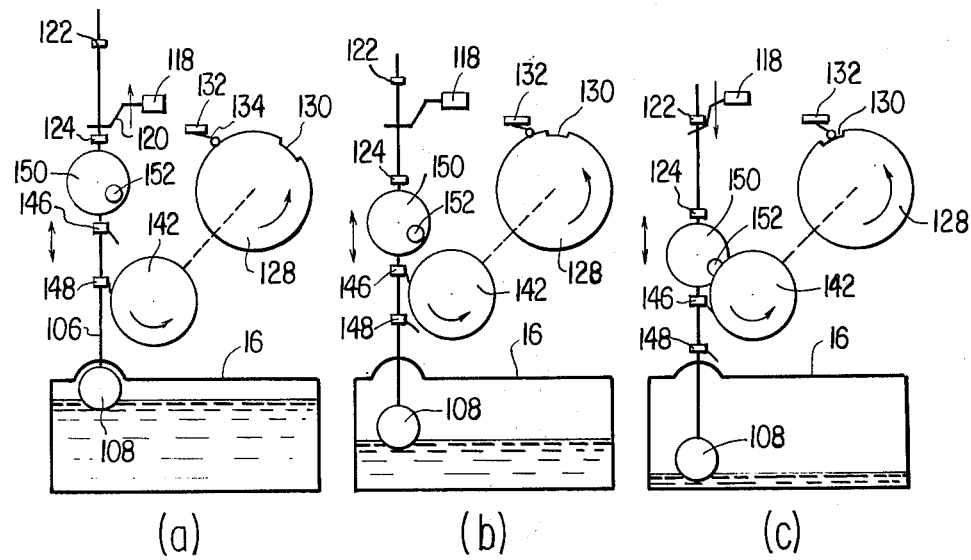

FIG. 7a shows schematically a first step of a typical sequence of operation of the control mechanism 104. In FIG. 7a the reservoir 16 is full, float 108 is in its highest vertical position and lower pawl 148 is in engagement with the teeth of wheel 142. Arm 120 is engaged by lower stop 124 to open switch 118 and stop pump motor 30. After an amount of purified water has been drawn from the reservoir 16 as shown in FIG. 7b, the upper pawl 146 engages the teeth of wheel 142 and correspondingly rotates disc 128. When float 108 reaches its lowest point of travel, indicating the reservoir is empty, the gear 142 will begin meshing engagement with gear wheel 142. If as shown in FIG. 7c, the disc 128 has been rotated sufficiently that the actuating arm 134 of switch 132 enters notch 130, contacts 132a and 132b close to energize solenoid valve 90 and start electric motor 150 thus initiating the backwash cycle. Electric motor 150 rotates disc 128 very slowly during the backwash cycle until the actuating arm 134 rides out of notch 130. The length of the notch 130 can be used to determine the duration of the backwash cycle. Closure of switch contacts 132a and 132b opens switch contacts 132b and 132c to thereby prevent switch 118, which has been closed by upper stop 122, from energizing feed pump 30 during the backwash operation. After actuating arm 134 is out of the notch 130 and again adjacent the periphery 129 of disc 128, switch contacts 132b and 132c close and contacts 132a and 132b open to de-energize solenoid valve 90 and electric motor 150 terminating the backwash cycle. Switch 118 which has been closed by upper stop 122 starts the pump 30 to filter and purify additional water to again fill the reservoir 16.

If the float 108 reaches the bottom of the reservoir 16 but the notch 130 is not in a position to receive the actuating arm 134, switch 118 will be closed by upper stop 122 to start the pump 30 and fill the reservoir. The number of times the float 108 travels up and down is an indication of the amount of water being purified and used. Thus, by positioning the pawls 146, 148 close together on rod 106, the degree of rotation of disc 128 can be controlled for each emptying of the reservoir 16. If the very slowly rotating electric motor 150 were mounted so that the gear 152 was always in engagement with gear wheel 142, the internal gear reduction (not shown) in the motor 150 would be a severe drag on the entire mechanism and prevent it from functioning. By mounting the motor 150 directly on rod 106, this drag is eliminated inasmuch as the gear 152 is only in engagement with gear wheel 142 when the float 108 is at its lowest point of travel.

Figure 8:
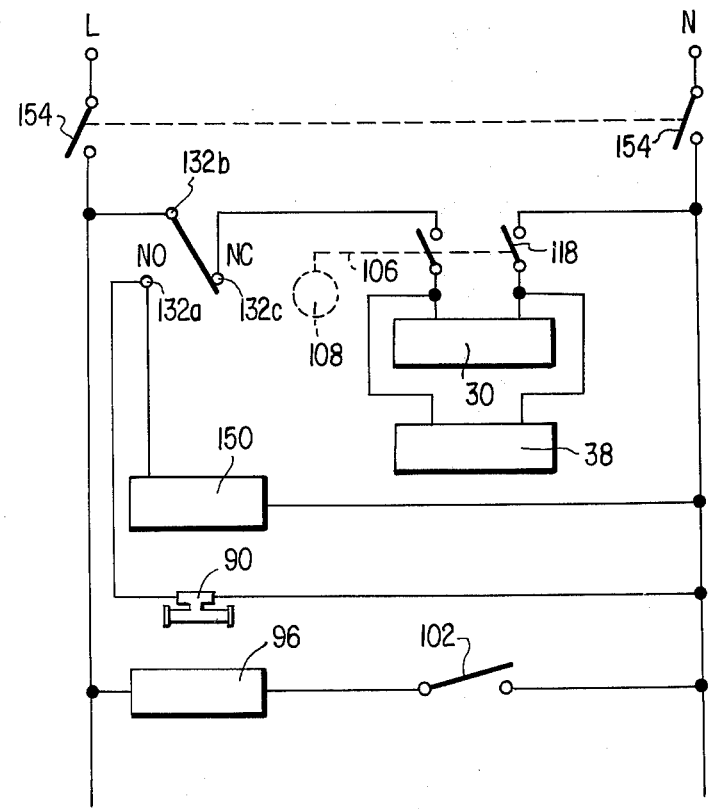
FIG. 8 is a block wiring diagram of the water purification apparatus.

FIG. 8 shows the wiring diagram of the plant 10. A main control switch 154 is connected between a source of voltage L, N and the remainder of the circuit.

Contacts 132b and 132c of switch 132 are connected in series with switch 118. Closure of switch 118 energizes raw water pump motor 30 and chemical feed motor 38. Closure of switch contacts 132a and 132b of switch 132 energizes small electric motor 150 and opens solenoid valve 90. Switch 102 closes to start water pump 96 in response to the degree of pressure in holding tank 84.

Having illustrated and described embodiments of this invention in some detail, it will be understood that these descriptions and illustrations have been offered by way of example only, and that the invention is to be limited in scope only by the appended claims.

What I claim is:

1. A water purification apparatus comprising:
   a. an aeration chamber means for areating unpurified water introduced thereto from a source;
   b. a filter chamber means directly beneath said aeration chamber means containing a granular media extending from the top to the bottom of said filter chamber for filtering said aerated water;
   c. means in said filter chamber for collecting said filtered water;
   d. reservoir means directly beneath said filter chamber for storing said collected water;
   e. automatic means for stopping the introduction of unpurified water to said aeration chamber when said reservoir means is full;
   f. automatic means for controlling the flow of said filtered water from said collecting means to said reservoir in response to the water level of said areated water in said filter chamber;
   g. means for introducing backwash water at different levels within said granular media; and
   h. automatic means for starting the introduction of said backwash water in response to the frequency said reservoir has been filled and emptied of purified water.

2. A water purification apparatus as set forth in claim 1 further comprising:
   a. a source of backwash water under pressure, and
   b. electrically actuated valve means connected between said source of backwash water and said means for introducing said backwash water at said different levels in said granular media.

3. An apparatus as set forth in claim 1 further comprising:
   a. valve means connected between said reservoir means and said collecting means and said source of backwash water; and
   b. float means mounted beneath said areation chamber and operatively connected to said valve means, said float means having a buoyancy sufficient to open said valve means when said filter chamber is full and having insufficient buoyancy to maintain said valve in said open position upon the introduction of said backwash water.

4. An apparatus as set forth in claim 2 further comprising:
   a. float means in said reservoir;
   b. wheel means having a circumferentially extending notch on the outer periphery thereof, said wheel means being operatively connected to said float means for rotating said wheel means as said float means drops in said reservoir; and
   c. first switch means adjacent said wheel means, said switch means having actuating means engaging said outer periphery, said actuating means closing said switch means to energize said valve means when said actuating means enters said notch.

5. An apparatus as set forth in claim 4 further comprising:
   a. gear means connected to said wheel means;
   b. rod means connected to said float means; and
   c. pawl means mounted on said rod, said pawl means engaging said gear means to rotate said gear means as said float drops in said reservoir.

6. An apparatus as set forth in claim 5 further comprising electric motor means mounted on said rod, said motor means having drive gear means which engages said gear means only when said float means is at its lowest level in said reservoir and wherein said switch means energizes said motor means when said actuating means enters said notch, said motor means rotating said notch a predetermined distance representing the duration said valve means is energized.

7. An apparatus as set forth in claim 4 wherein said means for stopping the introduction of unpurified water to said aeration chamber is a second switch means having an actuating arm operatively connected between spaced-apart stop means on said float means, said switch being actuated open by said stop means when said reservoir is full and actuated closed by said stop means when said reservoir is empty.

8. An apparatus as set forth in claim 7 wherein said first and second switch means are connected in series so that said second switch means is incapable of starting the introduction of unpurified water to said aeration chamber when said first switch actuating means is in said notch.

* * * * *